Sept. 22, 1970　　　　TADASHI MIZUNO　　　　3,529,453
DEVICE FOR LOCKING A STEERING AXLE IN AUTOMOBILES
Filed Aug. 29, 1968　　　　　　　　　　　　　　4 Sheets-Sheet 1

INVENTOR.
TADASHI MIZUNO

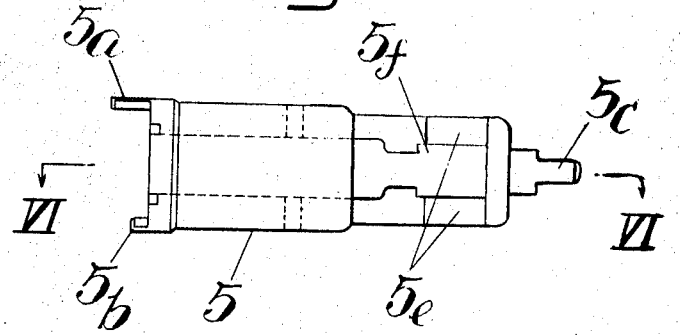
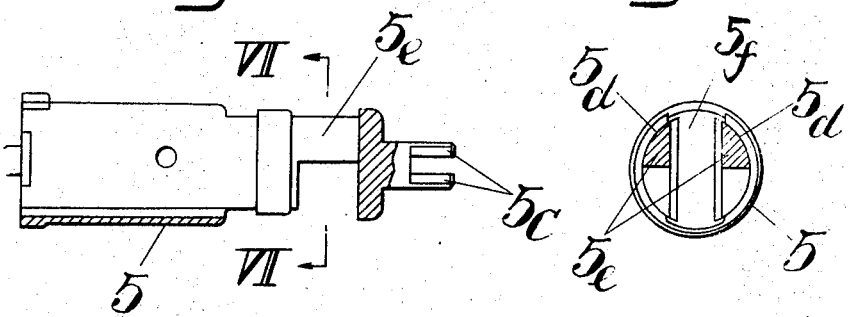

United States Patent Office 3,529,453
Patented Sept. 22, 1970

3,529,453
DEVICE FOR LOCKING A STEERING AXLE IN AUTOMOBILES
Tadashi Mizuno, Nagoya, Japan, assignor to Kabushiki Kaisha Tokai Rika Denki Seisakusho, Aichi Prefecture, Japan
Filed Aug. 29, 1968, Ser. No. 756,090
Int. Cl. E05b 65/12
U.S. Cl. 70—252                                    1 Claim

ABSTRACT OF THE DISCLOSURE

A device for locking a steering axle in automobiles, in which a locking bolt is partially protruded into the engaging portion of the steering axle or retracted therefrom by the rotation of a cylindrical member of comparatively long length with a rotor at its one end. Said rotation of the cylindrical member also works to set a rotary switch to plural contacting points including a locking position. A key inserted into the rotor and partly protruding from the rotor into the cylindrical member can abut against a plunger provided to one end of a lever mounted swingably inside the cylindrical member in relation to the movement of the locking bolt and prevents the bolt from protruding into the steering axle when the rotary switch is set to the contacting points other than the locking position.

---

The present invention relates to a device for locking a steering axle in automobiles which provides restraint or release of a steering axle in cooperation with closing or opening of an ignition circuit, and serves as an anti-theft device.

An object of the present invention is to provide a device for locking a steering axle in automobiles wherein a cylindrical tubular body or actuating cylinder of comparatively longer length is applicable since a protrusile shorter plunger engaging with a key according to a movement of the cylinder and locking bolt is included within a solid operating lever pivoted within said cylindrical tubular body and a locking bolt is shaded from the sight of a driver.

A further object of the present invention is to provide a device for locking a steering axle in automobiles comprising a cylinder type of lock having a rotor; a cylindrical tubular body or actuating cylinder rotating with the rotor of the lock to close or open a switching system of an ignition circuit and including a neck portion engaging with a collar or frame portion of a locking bolt; said locking bolt advancing to or retracting from a steering bolt according to rotation of said actuating cylinder; an operating lever including a plunger protrusile to engage with the key and pivoted swingably to said actuating cylinder inside the cylindrical bore; said operating lever moving swingably according to an advancing or retracting movement of said locking bolt and rotation of said actuating cylinder; spring means provided at the collar portion of the locking bolt; and said spring means normally pressing to advance said bolt to the steering column at a locking position of the key and being compressed to hold the bolt in the retracted place at other positions of the key, such as a garage position, a drive position and a start position.

In the accompanying drawings showing a preferred embodiment of a locking device according to the present invention, wherein, FIG. 1 is a front view of a locking device according to the present invention;

FIG. 5 is a front view of an actuating cylinder;

FIG. 6 is a sectional view of the actuating cylinder taken along the line VI—VI of FIG. 5;

FIG. 7 is a sectional view taken along the line VII—VII of FIG. 6; and

Description will be made with reference to the accompanying drawings.

Figure 1:
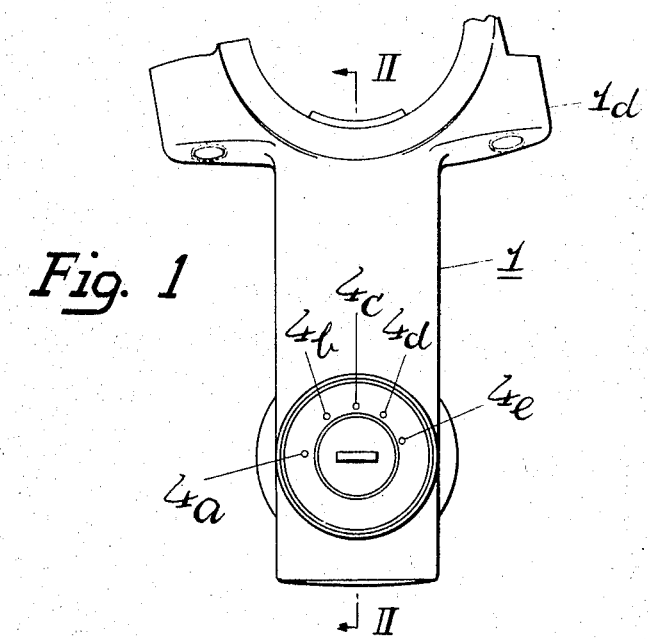

Numeral 1 is a main body contouring substantially a T-shape and consisting of an operative elements lodging portion 1a, a locking bolt lodging portion 1b, a switch mounting portion 1c and a mount portion 1d, by which the main body 1 is fixed to the steering column. Said operative elements lodging portion 1a accommodates a lock 2 of a cylinder type and an actuating cylinder 5 including therein an operating lever. At the leftmost side of said portion 1a, the lock 2 of cylinder type is mounted and has indications of a key position on a front side face thereof, as seen in FIG. 1; that is, these are a lock position 4a, an accessory position 4b, a garage position 4c, a drive position 4d and a start position 4e. Definition of each position is as follows. The locking position is to provide engagement of a locking bolt which will be described later, with a steering axle and blocking of all potential sources of an electric circuit. The accessory position provides engagement or disengagement of the locking bolt with or from the steering axle and closes only the potential source for accessary, such as a radio, with other potential sources left opened. The garage position release, the locking bolt from the steering axle and cuts off all potential sources.

The drive position disengages the locking bolt from the steering axle and closes the potential sources other than than for start. The start position is substantially similar in the drive position, with additional closing of the potential source for start. The cylinder type of lock 2 includes a rotor 2a, to which a disk plate 6 having holes is fixed, and a rotor casing 2b provided with a circumferential slot 2c. The actuating cylindrical tubular body 5 has at a leftmost end thereof a longer finger 5a and a shorter finger 5b, both of which are in engaged relation with holes of the disk plate 6 fixed to the lock 2, whereby the actuating cylinder 5 is connected operatively with the rotor 2a of the lock 2 to rotate integrally therewith according to turning of the key 3. Said longer finger 5a extends, through the hole of the disk plate 6, to the circumferential slot 2c of the rotor casing 2b extending between the lock position and the start position (see FIG. 1), and serves to prevent the actuating cylinder 5 from an excessive rotation. The actuating cylinder 5 is provided at an opposite end thereof with a projection 5c, which extends to a switch portion 7 and engages with or disengages from motive elements to close or open a potential source according to a position of the key. The actuating cylinder 5 is formed with a neck portion 5e having a hemispherical wall portion 5d with other hemisphere cut away and provided with a groove 5f extending vertically. Into said groove 5f, a slider 13 having a cavity 13a is fitted insertedly slidably. Numeral 8 is a bent-shaped operating lever, which is pivoted swingably to the actuating cylinder 5, eccentrically within the cylindrical bore thereof.

Figure 2:
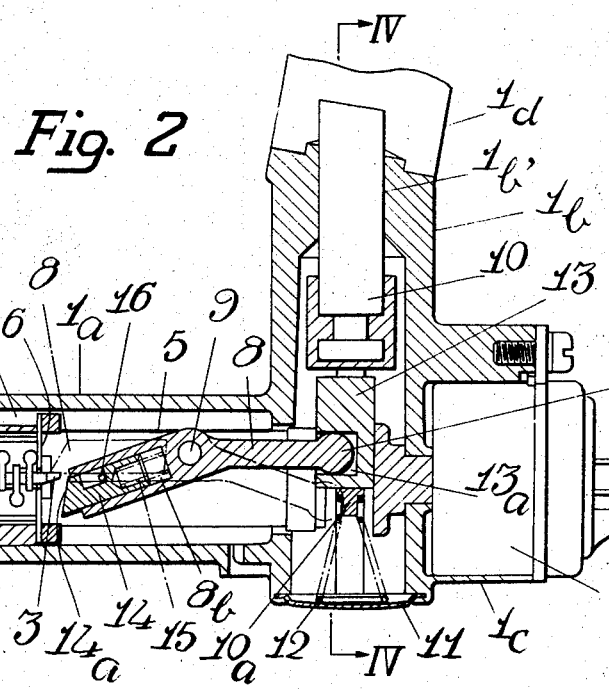
FIG. 2 is a sectional view of the device taken along the line II—II of FIG. 1.
Figure 3:
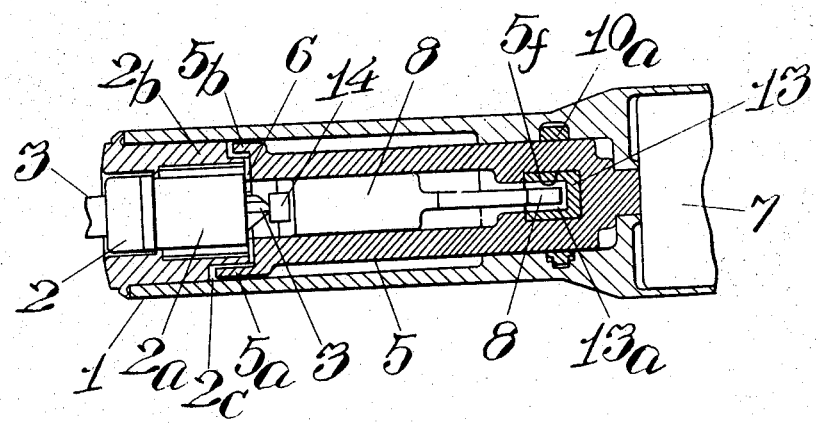
FIG. 3 is a sectional view taken along the line III—III of FIG. 2.

A locking bolt lodging portion 1b is provided with a slot 1b' extending vertically, along which a locking bolt 10 is provided movably in an longitudinal direction thereof to be advanced toward or retracted from the steering column. Said locking bolt 10 is provided at a lower end with a collar or frame portion 10a, through which the locking bolt 10 is normally pressed upwardly (in FIG. 2) by springs 12. The collar or frame portion 10a has a quadrilateral shape, of which upper side is a larger circular arc 10b and of which bottom side is a relatively smaller circular arc 10c. The collar or frame portion 10a has a space capable of receiving therein the neck portion 5e of the actuating cylinder 5 with the slider 13 fitted insertedly within its groove 5f and having the cavity 13a, into which a circular end portion 8a of the operating lever 8 is fitted, as best shown in FIG. 2. Said operating lever 8 is provided at a left end portion with a cavity or notch 8b, within which a plunger 14 having a tapered end 14a is arranged and normally pressed leftwardly (in FIG. 2) by springs 15, so that the operating lever 8 engages operatively with the key 3 through the plunger 14. A pin 16 is provided within said cavity or notch 8b to prevent an excessive projection of the plunger 14 over a limit.

Figure 4:
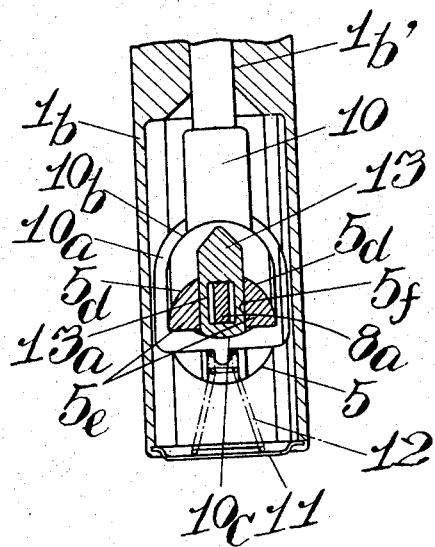
FIG. 4 is a sectional view taken along the line IV—IV of FIG. 2.
Figure 8:
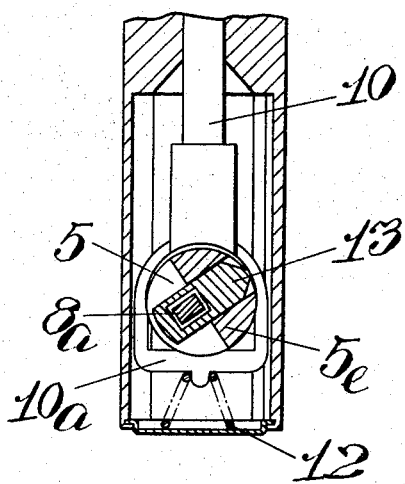
FIGS. 8 to 11 illustrate an engagement relation of a neck portion of the actuating cylinder with a collar or frame portion of the locking bolt, and each showing an accessory position (FIG. 8), a garage position (FIG. 9), a drive position (FIG. 10) and a locking position before withdrawal of the key (FIG. 11).

Operation is as follows:

When the key 3 is inserted into the lock 2, and turned clockwisely by an angle of 55° from the lock position 4a in FIGS. 1 and 4 to the accessary position 4b, as seen in FIG. 8, the actuating cylinder 5 rotating with the key 3 and the rotor 2a of the lock 2 closes the potential source for accessary by engagement of the projection 5c with the switch portion 7. Rotation of the actuating cylinder 5 causes the slider 13 fitted slidably to the grove 5f of the actuating cylinder 5 to abut at a sharp top end thereof with the circular inner face of the frame portion 10a of the locking bolt 10, resulting to make a downward movement or retracting movement of the locking bolt 10 against action of springs 12. With the locking bolt 10 moving downwardly, the slider 13 is pressed in an opposite direction in relation to the sharp top end with pressure of the collar or frame portion 10a against springs 12, and the operating lever 8 with the circular end fitted in the cavity 13a of the slider 13 is also pressed somewhat downwardly to a position between the actual line and the broken line in FIG. 2. This is the accessory position 4b, as best shown in FIG. 8.

Figure 9:
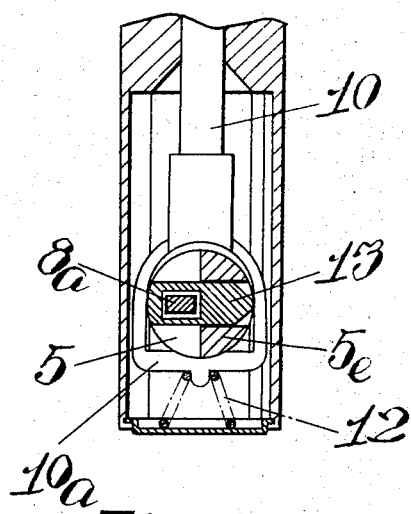

When the key 3 is further turned clockwisely by an angle of 35° to the garage position 4c in FIG.1, the actuating cylinder 5 opens all the potential source. Meanwhile the slider 13 conforming to rotation of the actuating cylinder 5 is further pressed to the extremity of retraction by the frame portion 10a (as shown in FIG. 9), thereby locating the operating lever 8 at the position shown with the broken line in FIG. 2. With the downwardyl swingable movement of the operating lever 8 at the circular end portion 8a fitted in the cavity 13a of the slider 13, another action is effected at the opposite notch portion 8b accommodating the plunger 14. The plunger 14 is moved upwardly, according to the downward movement of the operating lever 8, and engages its tapered end 14a with the key end 3. The plunger 14 with the tapered end 14a in contact with the key end is pressed rightwardly (in FIG. 2) against action of springs 15 to pass over the key end, and rests its tapered end thereon as shown with the broken line in FIG. 2. Thus, the engagement of the plunger 14 with the key is set up. This is the garage position.

Figure 10:
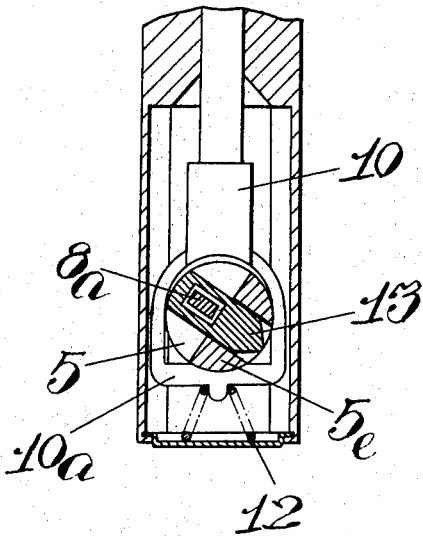

A further turn of the key 3 to the clockwise direction by an angle of 35° closes the potential sources of the electric circuit other than that for start, but maintain the locking bolt 10 and the operating lever 8 in the same position relation as in the garage position. This is the drive position 4d as shown in FIGS. 1 and 10. From this position, the key 3 is further turned clockwisely by an angle 35° to come to the start position 4e. Once the key 3 is turned to the start position 4e, the key 3 is restored automatically to the drive position 4d by the switching system provided in the switching casing 7.

Figure 11:
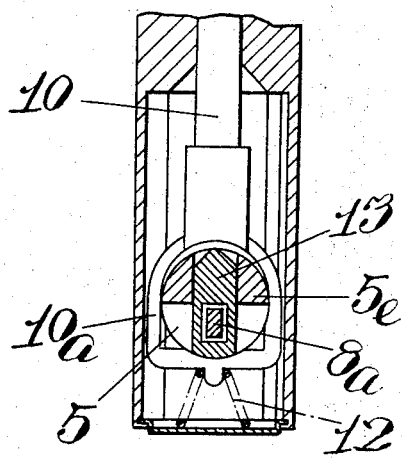

If the key 3 is turned back anticlockwisely to the lock position through the garage position and the accessory position, the plunger 14 is maintained in engaged relation with the end of the key 3 to restraint the swingable motion of the operating lever 8. On the other hand, the slider 13 is retained within the collar or frame portion 10a. Accordingly, the locking bolt 10 is retained in the retracted position against springs 12, as shown in FIG. 11.

When the key 3 is withdrawn from the lock 2, the plunger 14 is dropped downwardly to release the operating lever 8. Resultantly the locking bolt 10 which has been under restraint of the operating lever 8, is also released to move upwardly or to the projecting direction by action of springs 12 to engage with the steering axle.

The device for locking a steering axle in automobiles having such the construction as disclosed hereinabove can achieve objects disclosed in the introduction and assures the steady performance.

What is claimed is:

1. A device for locking a steering axle in an automobile comprising a cylindrical tubular body of comparatively long length engaging with a rotor having a key hole at one end and with rotatable elements of a rotary switch settable to plural electric contact points and having a neck portion provided at an intermediate portion between said two ends and relatively near to said rotary switch, said rotor being rotatable at a lock position providing a partial projection of the below-mentioned locking bolt and positions respectively corresponding to those of contact points of said rotary switch; a locking bolt having a top end partially projectable from a main body of the locking device transversely of a longitudinal axis of said cylindrical tubular body and being engageable with a steering axle, and a collar portion provided seriately to said top end and engaging with the neck portion of said cylindrical tubular body and being pressed resiliently in a direction of the steering axle, said neck portion of the cylindrical tubular body rotating integrally with the rotor to press the collar portion of the locking bolt against resiliency acting thereon and pressing the locking bolt to a retracted position thereof, when the rotor is rotated from said lock position over a given angle; and an operating lever having one end associating with rotation of said neck portion and the forwarding or retarding motion of said collar portion and other end having a protrusile plunger and pivoted swingably within said cylindrical tubular body, said plunger engaging with a key inserted into the key hole of the rotor when the locking bolt is pressed to a retracted position, and serving to prevent projection of said locking bolt.

References Cited
UNITED STATES PATENTS

| | | | |
|---|---|---|---|
| 2,063,088 | 12/1936 | FitzGerald | 70—252 |
| 2,101,446 | 12/1937 | Neiman | 70—186 |
| 2,868,007 | 1/1959 | Neiman | 70—252 |
| 3,132,503 | 5/1964 | Pieck et al. | 70—186 |
| 3,261,187 | 7/1966 | Eichenauer | 70—252 |

MARVIN A. CHAMPION, Primary Examiner

ROBERT L. WOLFE, Assistant Examiner